(12) United States Patent
Hung et al.

(10) Patent No.: US 8,396,620 B2
(45) Date of Patent: Mar. 12, 2013

(54) PATROL DEVICE AND PATROL PATH PLANNING METHOD FOR THE SAME

(75) Inventors: Wei-Han Hung, Taipei (TW);
Shih-Chung Kang, Taipei (TW); Peter Liu, Taipei (TW)

(73) Assignee: National Taiwan University, Taipei (TW)

( * ) Notice: Subject to any disclaimer, the term of this patent is extended or adjusted under 35 U.S.C. 154(b) by 902 days.

(21) Appl. No.: 12/507,747

(22) Filed: Jul. 22, 2009

(65) Prior Publication Data

US 2010/0138096 A1 Jun. 3, 2010

(30) Foreign Application Priority Data

Nov. 28, 2008 (TW) ................................ 97146430 A

(51) Int. Cl.
*G01C 22/00* (2006.01)
*G05D 1/00* (2006.01)
(52) U.S. Cl. .......................................... 701/25; 700/245
(58) Field of Classification Search ................ 701/25; 702/187; 700/245, 248; 340/10.6, 3.3; 318/568.12, 318/568.19
See application file for complete search history.

(56) References Cited

U.S. PATENT DOCUMENTS 5,321,629 A * 6/1994 Shirata et al. ................. 702/187
7,668,621 B2 * 2/2010 Bruemmer .................... 700/245

FOREIGN PATENT DOCUMENTS

| JP | 2002170197 A | * | 6/2002 |
| JP | 2002279576 A | * | 9/2002 |
| JP | 2007187584 A | * | 7/2007 |

* cited by examiner

*Primary Examiner* — Thomas Black
*Assistant Examiner* — Robert Payne

(57) ABSTRACT

The present invention relates to a patrol device and a patrol path planning method. The patrol device includes an operating unit configured to establish a plurality of patrol paths, each of which has an Average Patrol Omission (APO) value and an Average Patrol Quality (APQ) value, and to determine an optimum patrol path from the plurality of patrol paths according to the APO value and the APQ value; and a moving unit configured to move along the optimum patrol path. The method includes providing a plurality of patrol paths, each of which has an Average Patrol Omission (APO) value and an Average Patrol Quality (APQ) value; and evaluating the plurality of patrol paths according to the respective APO values and the respective APQ values so as to select an optimum patrol path therefrom.

20 Claims, 8 Drawing Sheets

PATROL DEVICE AND PATROL PATH PLANNING METHOD FOR THE SAME

FIELD OF THE INVENTION

The present invention relates to a patrol device and a patrol path planning method. More particularly, it relates to a security robot and a patrol path planning method thereof.

BACKGROUND OF THE INVENTION

Nowadays, the development of robot still puts emphasis on designs of mechanism, motion and path planning, and navigation. The other extensive and relevant inventions, such as face-recognition, voice-recognition, dactylogram-recognition and so on, belong to the scope of robots' physical motion and perceptive analysis. However, there are many limitations to apply robots to security industry so that robots usually take auxiliary jobs. As to the execution of security patrols, at present robots perform patrols for important site or random patrols for a whole region, but there is no integrated invention or discussion about a complete patrol for movements and paths. In security industry, a patrol duty performed by a robot is a fundamental and important ability. If a meaningful patrol path planning is based on geographical features of a patrol place, a self-conscious security robot can perform the patrol duties more efficiently to reduce the probabilities of invasion and property loss. When artificial intelligence, motion controlling and various algorithms for robots become more and more mature, the patrol path planning will be a critical problem for mankind. There are several methods for planning patrol paths among the present prior arts.

Using Potential Field is one of the common patrol paths planning methods for robots, and the method treats the whole environment as a potential field. A potential could be defined as an obstacle of the environment, a probability of chasing a target's location, or an unexplored region. When a trend of the potential is used to plan a route for robots, a location with high potential means a location of a obstacle. (G. Dozier, A. et al. 1998)

Markov Decision Processes (MDP) and Partially Observable Markov Decision Processes (POMDPs) for dynamic decisions to process simple path decisions and self-learning of robots are the common patrol paths planning methods. It is noted that parts of results of the methods are random and the other parts are made by the decisions.

Other inventions relating to patrol path planning include Traveling Salesman Problem (TSP) and Vehicle Routing Problem (VRP, Vigo 2001). TSP method is mainly used for a salesman to seek the shortest route that the salesman starts from an initial node, pass all nodes and then return to the initial node. VRP method is to seek a problem of deliver path planning for one or several vehicles, such as a route plan for a city bus. Although there are several prior arts as the above patrol path planning methods, there is no patrol path planning methods based on a graph at present.

Therefore, it would be useful to invent a patrol device and a patrol path planning method to circumvent all the above issues. In order to fulfill this need the inventors have proposed an invention "PATROL DEVICE AND PATROL PATH PLANNING METHOD FOR THE SAME."

SUMMARY OF THE INVENTION

The invention provides a patrol model which a security robot performs in a building and an estimating index of a patrol planning. Besides, a patrol path planning method is developed for a security robot performing a self-decided patrol in a patrol region. Furthermore, a security robot adopting such patrol path methods to patrol is developed. A patrol device and patrol path planning thereof provided by the invention are all based on a graph and in particular on a directed graph as a planning core so as to plan a patrol path efficiently.

According to the first aspect of the present invention, a patrol path planning method includes the steps of: providing a plurality of patrol paths, each of which has an Average Patrol Omission (APO) value and an Average Patrol Quality (APQ) value; and evaluating the plurality of patrol paths according to the respective APO values and the respective APQ values so as to select an optimum patrol path therefrom.

Preferably, the planning method further includes the steps of: providing a plurality of patrol regions; and providing a plurality of possible paths each of which connects all of the plurality of patrol regions.

Preferably, the planning method further includes the steps of: determining the plurality of patrol paths according to the plurality of possible paths by an algorithm based on a directed graph; and calculating all the APO values and all the APQ values of the plurality of patrol paths to select the optimum patrol path.

Preferably, the planning method is provided, wherein the directed graph having the plurality of patrol regions and a plurality of passages for an operation of the algorithm.

Preferably, the planning method is provided, wherein the plurality of possible paths have a plurality of path combinations to be the plurality of patrol paths.

Preferably, the planning method is provided, wherein the algorithm is one of a Shortest Path Permutation Method (SPPM) and a Locally Optimum Repetitious Method (LORM).

Preferably, the planning method is provided, wherein the SPPM is performed by a Dijkstra algorithm.

Preferably, the planning method is provided, wherein the LORM is performed by a Patrol Depth First Search (P-DFS) algorithm.

Preferably, the planning method is provided, wherein the P-DFS algorithm uses at least one of a Patrol Time (PT) and a Repeat Limit (RL) as an operating limitation.

Preferably, the planning method is provided, wherein each of the plurality of patrol paths passes through a plurality of passed patrol regions each of which has a Patrol Omission value and a Patrol Quality value, and the APO value and the APQ value are respectively an average of the respective Patrol Omission values and an average of the respective Patrol Quality values of the plurality of passed patrol regions of the corresponding patrol path.

Preferably, the planning method is provided, wherein the optimum patrol path is provided to a robot for moving accordingly.

According to the second aspect of the present invention, a route planning method includes the steps of: providing a plurality of patrol paths and a plurality of selected patrol regions each of which has a Patrol Omission (PO) value and a Patrol Quality (PQ) value; and selecting an optimum patrol path from the plurality of patrol paths according to one set of values selected from a group consisting of the respective PO values, the respective PQ values and a combination thereof.

Preferably, the planning method is provided, wherein the plurality of patrol paths are provided by a Patrol Depth First Search (P-DFS) method.

Preferably, the planning method further includes using at least one of a Patrol Time (PT) and a Repeat Limit (RL) as an operating limitation of the P-DFS method.

Preferably, the planning method further includes a step of establishing a patrol model having a plurality of patrol regions and a plurality of possible patrol paths each of which connects at least two of the plurality of patrol regions.

Preferably, the planning method further includes the steps of: providing the plurality of patrol paths according to the plurality of possible patrol paths by an algorithm; and calculating the respective PO values and the respective PQ values to select the optimum patrol path.

According to the third aspect of the present invention, a patrol device includes: an operating unit configured to establish a plurality of patrol paths, each of which has an Average Patrol Omission (APO) value and an Average Patrol Quality (APQ) value, and to determine an optimum patrol path from the plurality of patrol paths according to the APO value and the APQ value; and a moving unit configured to move along the optimum patrol path.

Preferably, the patrol device is provided, wherein the operating unit is one selected from a group consisting of a desktop computer, a notebook computer, an industrial computer and an electrical device having an operating processor, the APO value and the APQ are calculated by the operating unit, and the moving unit is a vehicle.

Preferably, the patrol device is further configured in a robot.

Preferably, the patrol device is provided, wherein the operating unit establishes a patrol model having the plurality of patrol paths, and the moving unit receives a moving command from the operating unit so as to move along the optimum patrol path.

The foregoing and other features and advantages of the present invention will be more clearly understood through the following descriptions with reference to the drawings:

DETAILED DESCRIPTION OF THE PREFERRED EMBODIMENT

The establishment of a patrol model is described as follows.

Figure 1A:
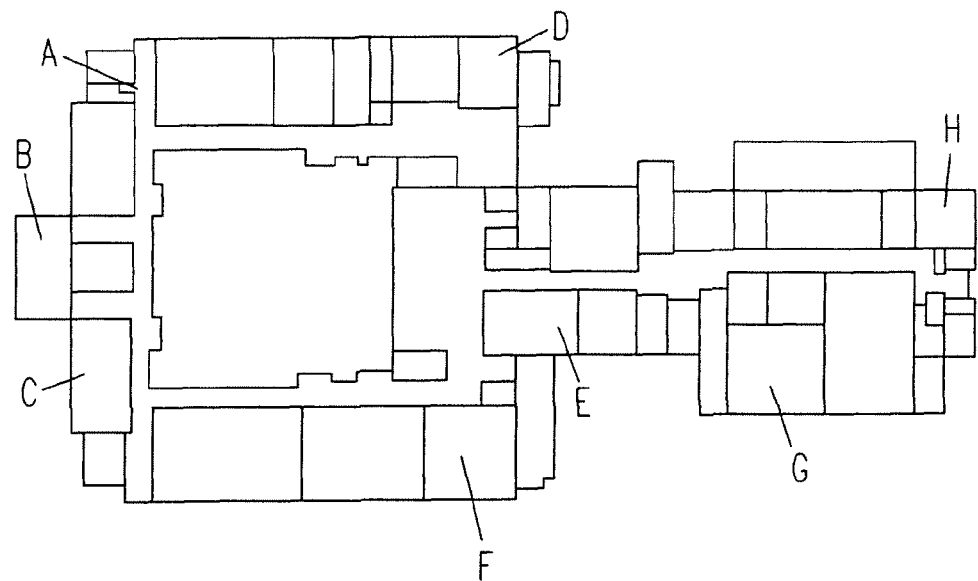
FIG. 1a is a diagram showing a target region.
Figure 1B:
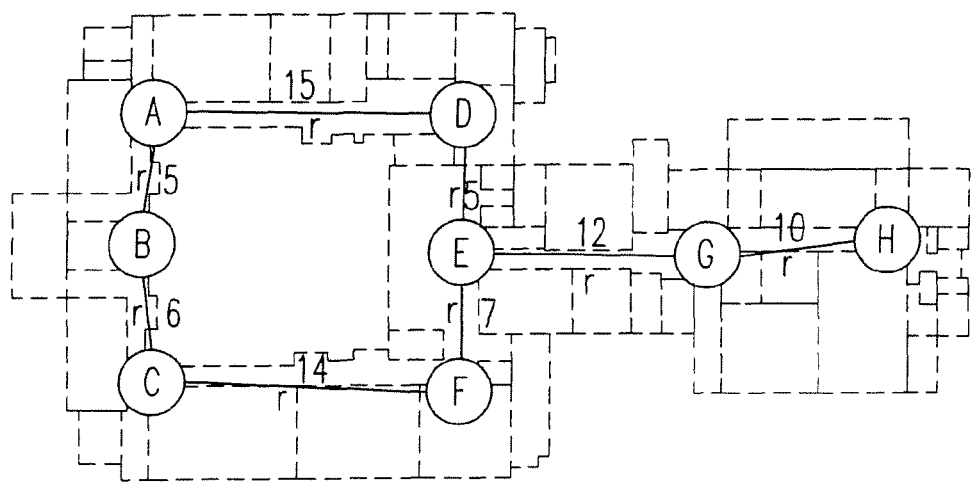
FIG. 1b is a diagram showing a patrol model corresponding to the target region.

Before a patrol path/route is planned, a patrol model must be established. Please refer to FIG. 1a and FIG. 1b which respectively show a target/virtual region and a patrol model corresponding to the target region. The purpose of patrol is that a patrolman must reach meaningful patrol sites within a specific time to check the sites and to perform his mission/task, such as entrances of a building, an important motor room, corners, passages and so on. If there is a plane region (as shown in FIG. 1a) which needs a patrol, the plane region would be defined as a target/virtual region first and then the target/virtual region would be divided into several meaningful patrol regions according to patrol sites. The target region includes several patrol regions A, B, C, D, E, F, G and H, and each of the patrol regions could be adjacent to each other or just some of the patrol regions could. If the patrol regions are adjacent to each other, the patrol regions are connected by passages. Hence, the above patrol can be transferred to a patrol model illustrated by a directed graph as shown in FIG. 1b. The patrol regions A, B, C, D, E, F, G and H, and a possible path r connecting adjacent patrol regions are shown in FIG. 1b where the annotations by the possible path r are the time costs, which means how much time a patrolman spend from one patrol region to another region. For example, it takes 15 seconds form patrol region A to patrol region D. Based on the above statement, a patrol model with a directed graph could be established and the patrol model includes patrol regions A, B, C, D, E, F, G and H, and a plurality of possible paths connecting adjacent patrol regions.

After the patrol model is established, the patrol regions are categorized according to the features of the patrol regions. The first category is Exit and Entrance Region. The main factor affecting security of a whole patrol region is an entrance so that entrances of a target region take very important places for a patrolling process. When a probability of invasion caused by an entrance omission increases, such as entrances of a building, an elevator, a staircase and so on, it would subsequently make the danger of the target region increase. The second category is Valuable Region. This kind of regions represents an especially meaningful part or a part with property to protect of the whole target region, such as a computer room, a shop and so on. These places are the most important parts of the target region because they would cause the target region much loss. The third category is Common Region. Regions with geometric features (such as long and/or narrow passages, corners and so on) and valueless regions (such as classrooms and restrooms of a school and so on) are categorized into Common Region. When an omission happens, the importance of Common Region is not higher than the other two categories relatively.

In order to simulate the situation of a patrol, four patrol parameters are defined as shown in List 2. The four parameters are operated to obtain a patrol priority at some time, and all of the patrol priorities could determine whether a plurality of possible paths is effective to protect the whole target region or not. It is noted that there are several ways to operate these four patrol parameters according to the features of the patrol regions.

| LIST 2 | |
|---|---|
| Patrol Parameter | Meaning |
| Region Priority (RP) | a comparison value, representing importance of a patrol region. |
| Allowed Vacant Time (AVT) | the most vacant time allowed for a single region, representing that the single region shall be patrolled within the time. |
| Remaining Vacant Time (RVT) | remaining time to achieve AVT of a patrol region after last patrol, representing that the patrol region shall be patrolled after how much time and once the patrol region is patrolled, the value will be re-set to the AVT value of the region. |
| Patrol Priority (PP) | based on the type of patrol regions, a patrol priority of a patrol region at some moment is |

-continued

LIST 2

| Patrol Parameter | Meaning |
|---|---|
| | calculated by using RVT and RP of the patrol region, representing the patrol priority of the patrol region at the moment. |

The patrol regions would transfer into one of two states according to RVT where the one state is "Normal" and the other is "Patrol Alert." If the RVT is smaller than zero which means that the time to patrol the patrol region goes beyond the time at which the patrol region is supposed to be patrolled, the patrol region transfers into Patrol Alert state. When the patrol region transfers into "Patrol Alert" state, it represents the occurrence of Patrol Omission (PO). The level of omission is according to the feature of the patrol region, and the OP value equals the PP value at "Patrol Alert" state. The more important the patrol region is, the higher the PO value is. Once a robot performs a patrol in the patrol region, the RVT will be reset to the value of the AVT.

The planning of patrol paths is described as follows.

After the patrol model is established, patrol paths could be found in the plurality of possible paths in the patrol model. This is one path or at least one path through which the patrolman could check all the patrol regions and return to the initial patrol region. Therefore, the plurality of patrol paths could be deemed a combination of the plurality of the possible paths. Several algorithms based on a directed graph are adopted to determine the plurality of patrol paths from the plurality of the possible patrol paths in the invention, and the algorithms includes Shortest Path Permutations Method (SPPM) and Locally Optimum Repetitious Method (LORM).

Figure 2:
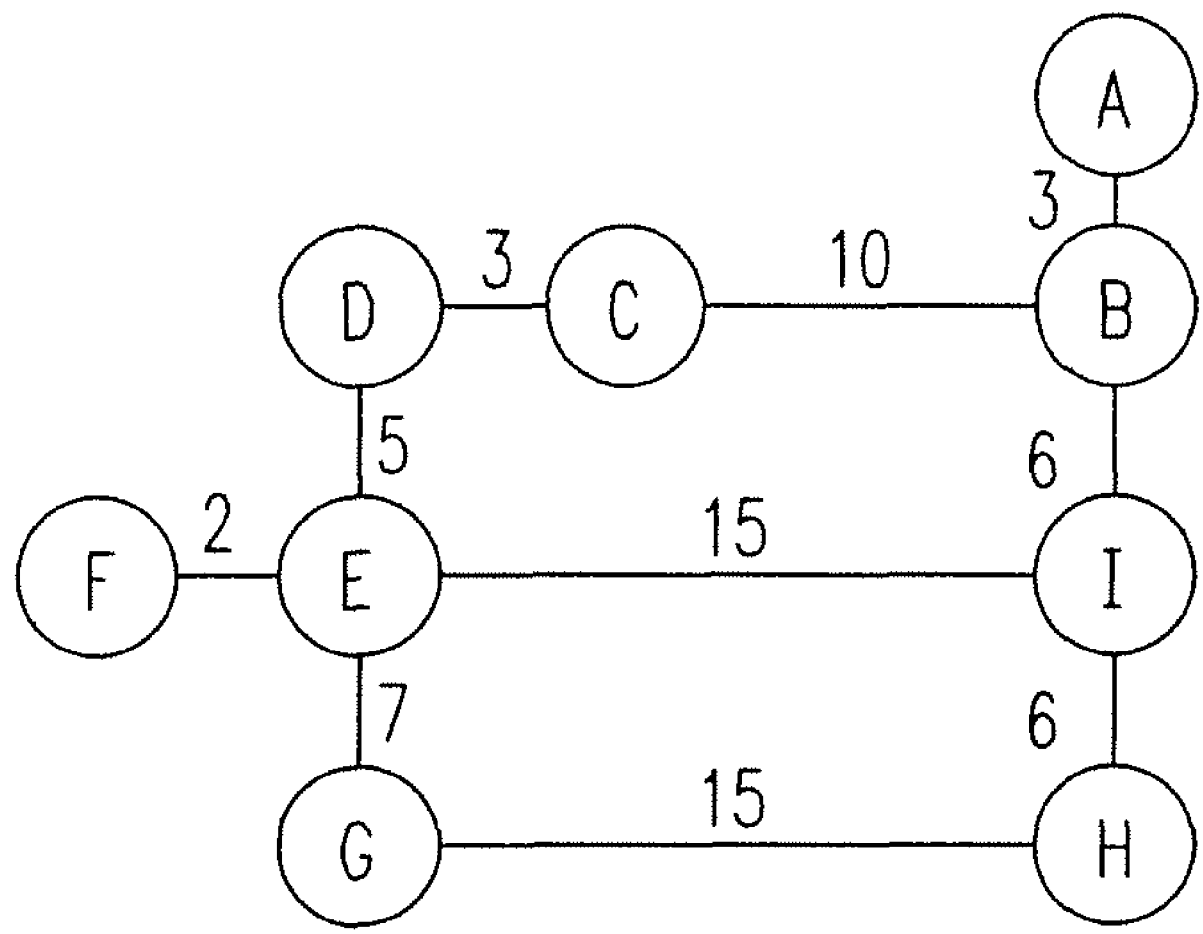
FIG. 2 is a diagram showing a patrol model adopted by SSPM.
Figure 3B:
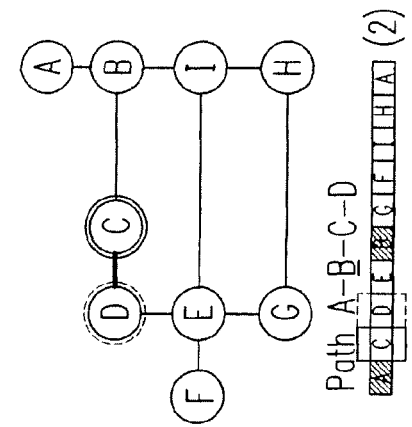
FIGS. 3a to 3h are diagrams showing operating processes of SPPM.
Figure 3D:
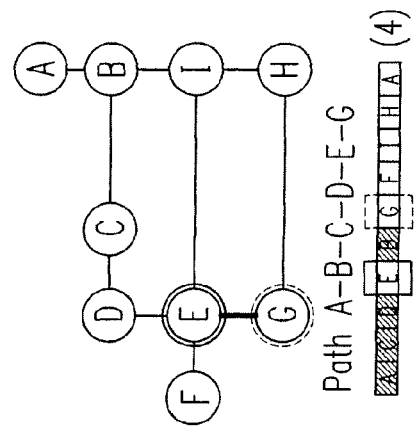
Figure 3A:
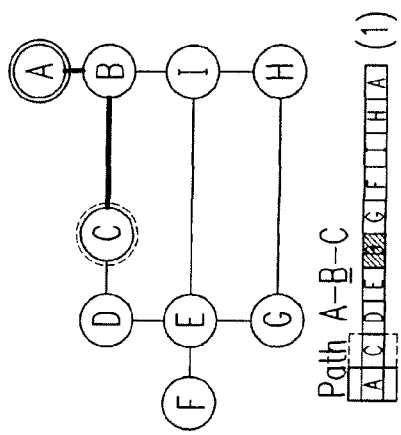
Figure 3C:
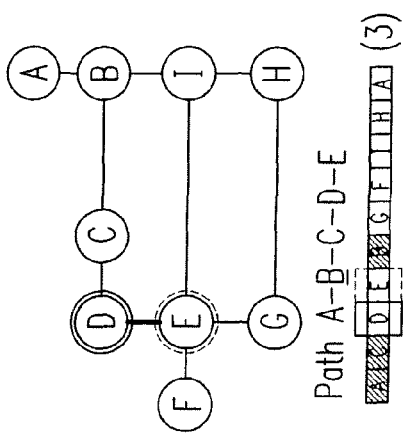
Figure 3E:
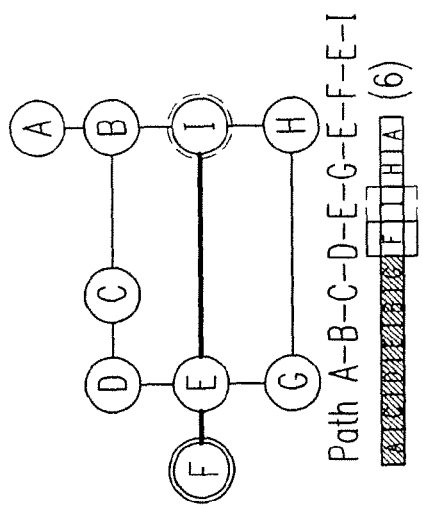
Figure 3F:
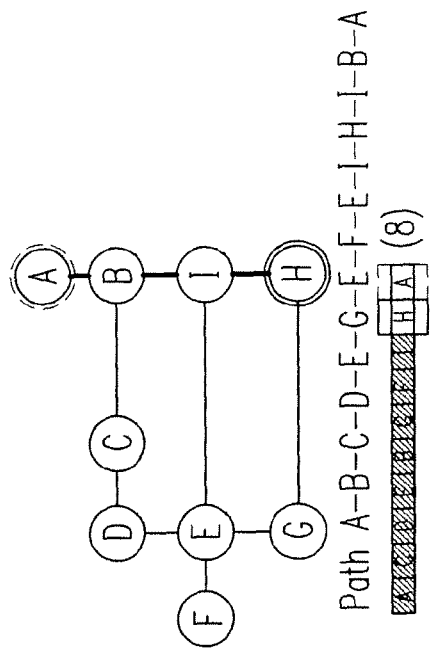
Figure 3G:
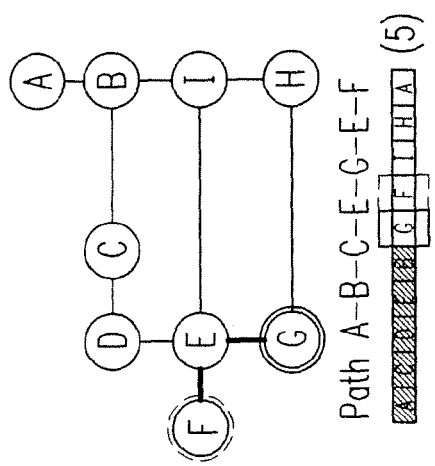
Figure 3H:
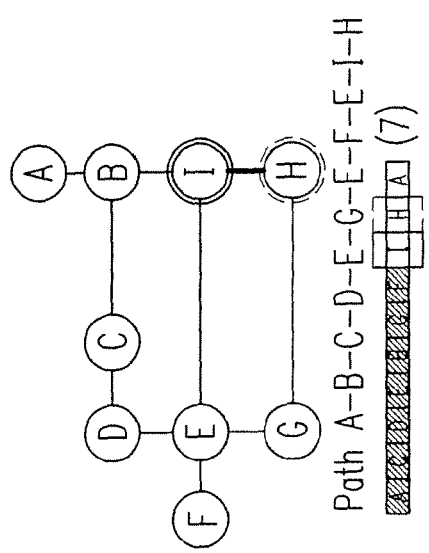

Please refer to FIG. 2, which shows a patrol model adopted by SSPM. In the patrol model of FIG. 2, it is desired to find out one or one preferred periodic patrol path. A patrol period is defined as the time that a robot spend to pass patrol regions A to I and then to return to the initial site. No matter what is the path between two patrol regions, any order of all the patrol regions could become the possible paths. Therefore, it becomes an issue of permutation and combination. Taking the model in FIG. 2 as an example, there are in total of 8! possible patrol paths except the initial site and the final site. A part of all the possible paths in the patrol model in FIG. 2 is listed in List 1. Since the patrolman moving between two patrol regions may pass through other patrol regions, some of the solutions in List 1 would not occur in fact. It is noted that the SPPM could filter out these impossible paths.

List 1

| | | Step | | | | | | | | |
|---|---|---|---|---|---|---|---|---|---|---|
| Path | Initial Point | 1 | 2 | 3 | 4 | 5 | 6 | 7 | 8 | Final Point |
| 1 | A | B | C | D | E | F | G | H | I | A |
| 2 | A | C | D | E | B | G | F | I | H | A |
| 3 | A | B | C | D | E | G | F | I | H | A |
| 4 | A | C | D | E | E | F | H | G | I | A |

Please refer to FIG. 3, which shows an operating process of SPPM. Taking the possible patrol path 2 in List 1 as an example (the operating process thereof is shown in FIG. 3), the patrol region enclosed by a circle is an initial site of every step, the part enclosed by a dotted circle is a final site and the thick line is the shortest path from the initial site to the final site. Dijkstra algorithm is used to find out the shortest path between any two patrol regions in FIG. 3. The step 1 from patrol region A to patrol region C must pass through patrol region B so that an unreason of the order of the path would be found out. Based on the unreason, the patrol regions of the step 5 could be removed and one path solution of all the obtained periodic patrol is A-B-C-D-E-G-E-F-E-I-H-I-B-A. The result is the same as the possible patrol path 3 in List 1. By this method, the repeated path order and other impossible path order could be removed, such as the possible patrol path 4 in List 1, because the patrol region B must be passed between the patrol region A and the patrol region C.

By repeatedly testing each possible path in the patrol model, the repeated possible paths and the other impossible paths are removed so that a plurality of patrol paths could be determined. Finally, the PO value and the Patrol Quality (PQ) value of the patrol paths selected by SPPM are obtained by calculation and operation. By estimating or evaluating the PO and the PQ of each patrol paths, an optimum patrol path is selected from the plurality of patrol paths and then a patrolman performs a patrol task according to the optimum patrol path.

As to Locally Optimum Repetitious Method (LORM), taking a target region in FIG. 2 into account, an optimum patrol path is desired. A possible way is to evaluate or estimate all the possible paths and then an optimum solution is selected according to an estimated standard. Since there are infinite possibilities to find a possible path for long-time walking, only the possible paths within a specific time could be found. For example, finding or determining a two hour optimum path is the first step and then a two-to-four hour optimum path could be found or determined according to the state after two hours from the beginning. By this way a long-time planning for paths could be obtained and this is Locally Optimum Method (LOM) which is developed by the present invention.

Depth-First Search (DFS) is used to search/seek an optimum patrol path locally, the algorithm is mainly to search a depth of a graph, and once the number of the passed patrol regions arrives at the limitation of the depth, the algorithm would cease the searching and then return to last patrol region to search the other breadths. Taking the patrol model in FIG. 2 for example, when the limitation of the depth is six and the initial patrol region is A, the first possible path could be A-B-C-D-E-F and the second possible path could be A-B-C-D-E-G. Therefore, all the possible paths within the limitation of the depth could be sought or found, and this is the prior algorithm, DFS. The present invention develops Patrol Depth First Search (P-DFS) method to solve the two problems encountered by the prior art, DFS. The problems are described as follows.

Figure 4A:
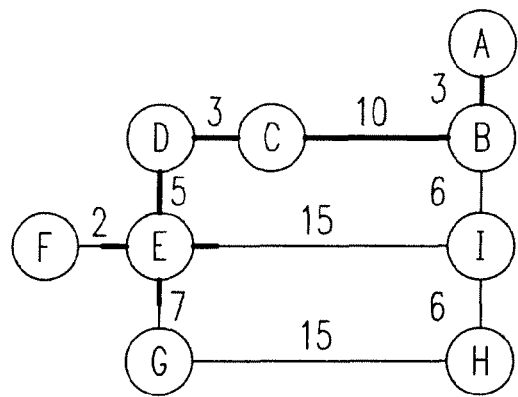
FIGS. 4a to 4c are diagrams showing all the possible paths with PT of 22 minute.
Figure 4B:
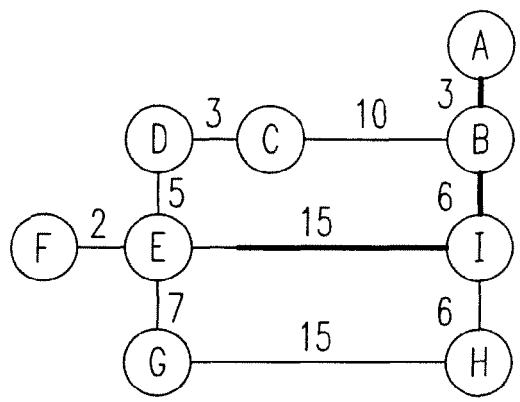
Figure 4C:
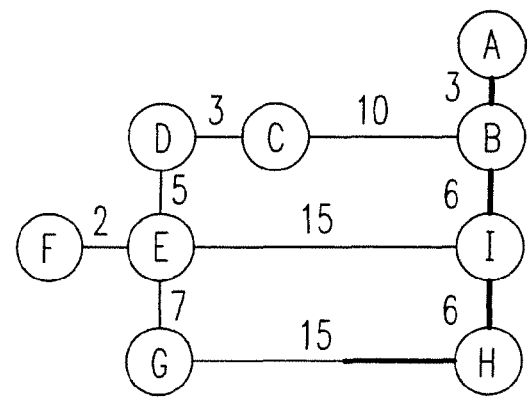

(1) Using the depth as the limitation of ceasing the searching would cause the times spent by the paths not consistent: Since the time cost of each edge is different, the times of all the paths found or determined according to the limitation of the depth are different. Under the condition of the different times, it is impossible to compare the patrol omission (PO) with the patrol quality (PQ). If it is forced to compare and test these results, the path found by it is not the real optimum path. In order to unify the times, the present invention uses Patrol Time (PT) as the limitation for ceasing the searching. Taking the model in FIG. 2 for example, if the patrol time is set to 22 minutes and the initial region is A, there will be three patrol paths as shown in FIG. 4, the diagrams of all the possible paths with PT of 22 minute. By this way, all the possible paths within the same patrol time could be compared with each other and tested to find or determine the proper solution for the patrol path.

Figure 5:
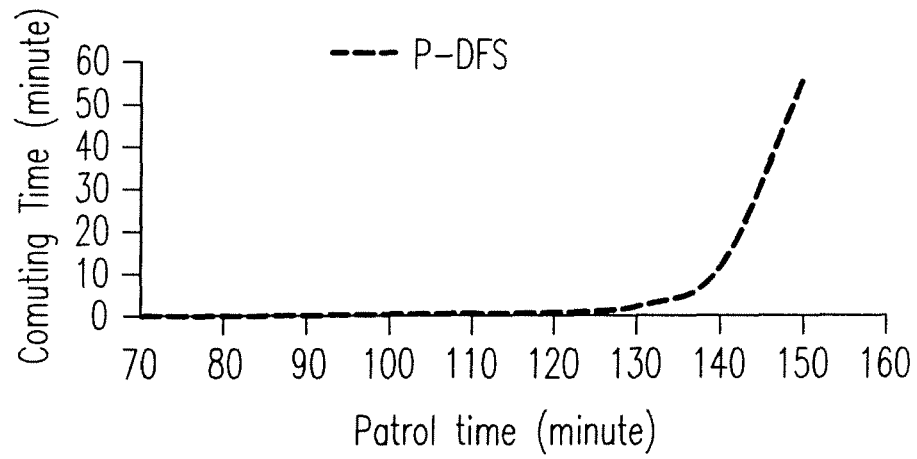
FIG. 5 is a diagram showing relationship between patrol time and computing time.
Figure 6:
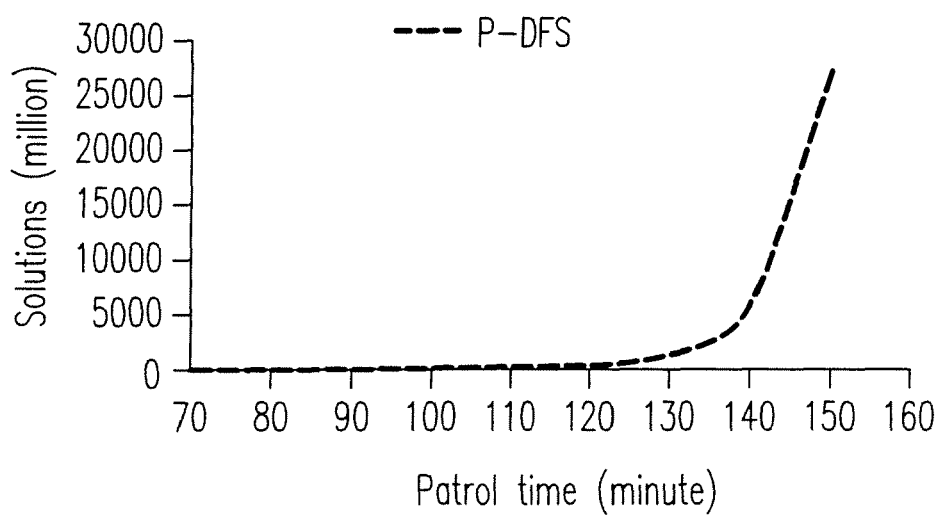
FIG. 6 is a diagram showing relationship between patrol time and solution of possible paths.

(2) The prior Depth-First Search (DFS) does not take the passed regions into account:
Because the issue of patrol does not restrain the patrolled regions from being patrolled repeatedly within a short period, some more important regions are supposed to be patrolled more than twice before some less important regions are patrolled instead of being patrolled after all the patrol regions are patrolled so that the more important regions are ensured to be save. However, the prior DFS is to find/determine a specific patrol region so it restrains that the patrol regions can not be passed repeatedly. The invention removes the restraint but it makes the other problem comes up that a plenty of unreasonable patrol path solutions cause a computer huge computing and a longer computing time. Taking the model in FIG. 2 for example, please refer to FIG. 5 and FIG. 6 which respectively are a relationship diagram between patrol time and computing time and a relationship diagram between patrol time and solution of possible paths. When the patrol time exceeds 140 minutes, the number of path solution rapidly and exponentially increases and the rate of increasing are related to the margin number of the diagram and the cost. One of the unreasonable patrol paths is a repeated round path like A-B-A-B-A-B . . . . In order to filter out these unreasonable patrol path solutions, when Depth-First Search (DFS) is used to search an optimum patrol path, Repeat Limit (RL) allowing the patrol regions to be repeatedly passed within a specific times is given to reduce the computing time of the computer so that a longer optimum patrol path solution could be searched/found. The given RL must be based on the PT and the total cost of all the edge, and if the RL is too small some effective patrol paths would be filtered out.

By the Patrol Depth First Search (P-DFS) of the invention, all the patrol paths of the model within the specific period could be found/determined, and each Average Patrol Omission (APO) and Average Patrol Quality (APQ) of the patrol paths is evaluated and calculated so as to select an optimum patrol path from the patrol paths. A patrolman executes a patrol task based on the optimum patrol which is selected according to APO and APQ or an operating result thereof.

In conclusion, using the SPPM could find/determine an optimum patrol path within a very short time for patrolling all the patrol regions and maintain the average patrol quality. The LORM could plan a complete and long-term patrol path according to features and importance of each patrol region so as to reduce the possibility of patrol omission. A patrol path without a fixed period is much better for guarding against an invasion to reduce loss. Furthermore, with the record of patrol omission for each moment, a manager could use other methods to increase the security according to time and region of patrol omission on the patrol path so that a security robot could assist with security task more efficiently.

The estimating index of patrol paths is described as follows.

Through an establishment of a patrol model, the invention provides two patrol indexes for users to estimate: Average Patrol Omission (APO) and Average Patrol Quality (APQ) which is respectively used for estimating a risk of patrol path omission and quality of possible paths.

As to Average Patrol Omission (APO), Patrol Omission (PO) represents a unit (time) when a patrol region exceeds Allowed Vacant Time (AVT). When the patrol exceeds its Allowed Vacant Time (AVT), its Patrol Omission (PO) is set to 1. If the time exceeds twice the AVT, the PO is set to 2 and so forth. By the PO value, it is known how many times AVT is exceeded at the moment (right now) for the patrol region. It is better if the PO value is less. However, since the importance of each patrol region is different, the PO value could not be used to tell the degree of loss when a patrol omission happens. Therefore, the invention sets the PO value to the Patrol Priority (PP) of the patrol region with Patrol Alert state. That is, when the Remaining Vacant Time (RVT) of the entrance or valuable region is 0, the PO value thereof is set to 1.5 and the PO value of a common region is set to 0.5 so that the loss caused by the whole patrol planning could be estimated by these values which could be deemed risk-estimated value of the patrol path planning. The Average Patrol Omission is used as an estimating index and is calculated by using Equation 1. The meaning of the APO value is that the sum of each PO of the patrol regions of a target region at each moment is divided by a time consisting of the moments. If the value is bigger than 1, it means that the patrol path planning would cause at least one patrol region to have a patrol omission every moment. For example, a basic standard need to be attained is to set the APO to 0.5.

$$y(t_p) = \frac{\sum_{t=0}^{t_p} \sum_{i=1}^{n} PO_i(t)}{t_p} \quad (1)$$

Referring to the Equation 1, t is a time variable and $y(t_p)$ is the APO accumulated from t=0 to t=$t_p$. Furthermore, $PO_i(t)$ is the PO value of the patrol region i at time t and the way to calculate the PO could be based on the PP of different patrol regions when RVT is smaller than 0.

As to Average Patrol Quality (APQ), Patrol Quality (PQ) represents a ratio of an average vacant time of a patrol path planning result to an Allowed Vacant Time (AVT) of a patrol region, and it is calculated by using Equation 2. The smaller the ratio, the safer the region. Furthermore, an Average Patrol Quality of all patrols, for example, is used as the other patrol estimating index and it represents an average achievement rate of the patrol path planning within the predetermined AVT. If the rate is below 100%, it means that the patrol path planning could make the patrol overall achieve the predetermined time.

$$q(t_p) = \frac{\left(\frac{t_p}{n}\right)}{AVT} \times 100\% \quad (2)$$

Referring to the Equation 2, $q(t_p)$ is a PQ of a patrol region at t=$t_p$ and n is the number of times that a patrol region has been patrolled from t=0 to t=$t_p$.

For example, an effective patrol path planning could be defined that the APO value is below 0.5 and the APQ value is below 100%. The defined effective patrol path planning is meant to maintain that there is less than one patrol omission of patrol regions every unit time. 0.5 is the value added by security value of 0.5. The APQ value of 100% shows that patrol regions could achieve a predetermined AVT, and the estimation of the APQ value is not absolute but relative. Furthermore, parameters of each patrol region are different in the same case so that it would make big affection on patrol path planning with the same APO and APQ values.

APO is a patrol index needing to be a first priority for affecting security of a patrol region. By the APO value, the feasibility of a predetermined AVT of a patrol region could be estimated and then it could be adjusted according to the result. If a patrol path planning could maintain a very low APO value, it is better to reduce the AVT of the patrol regions based on APQ thereof. APQ is used for estimating an achievement rate of AVT of whole patrol regions and the value below 100% means that most of patrol regions could complete their patrol task within a predetermined time. There is no absolute relationship between the two indexes. If APO of a path planning is maintained at 0, there would be no patrol omission during the patrol. Meanwhile, it means that APQ value thereof can achieve below 100%. The lower APO value makes APQ could maintain within a certain standard but the magnitude of APO value does not affect APO too much. A path planning should take a low APO as a rule to reduce possibility of an omission and then the whole patrol quality could be enhanced by adjusting APQ.

In conclusion, by calculating and then estimating APO and APQ of each patrol path, a proper optimum patrol path could be selected from all the patrol paths and a patrolman could perform his patrol task according to the optimum patrol path.

Figure 7:
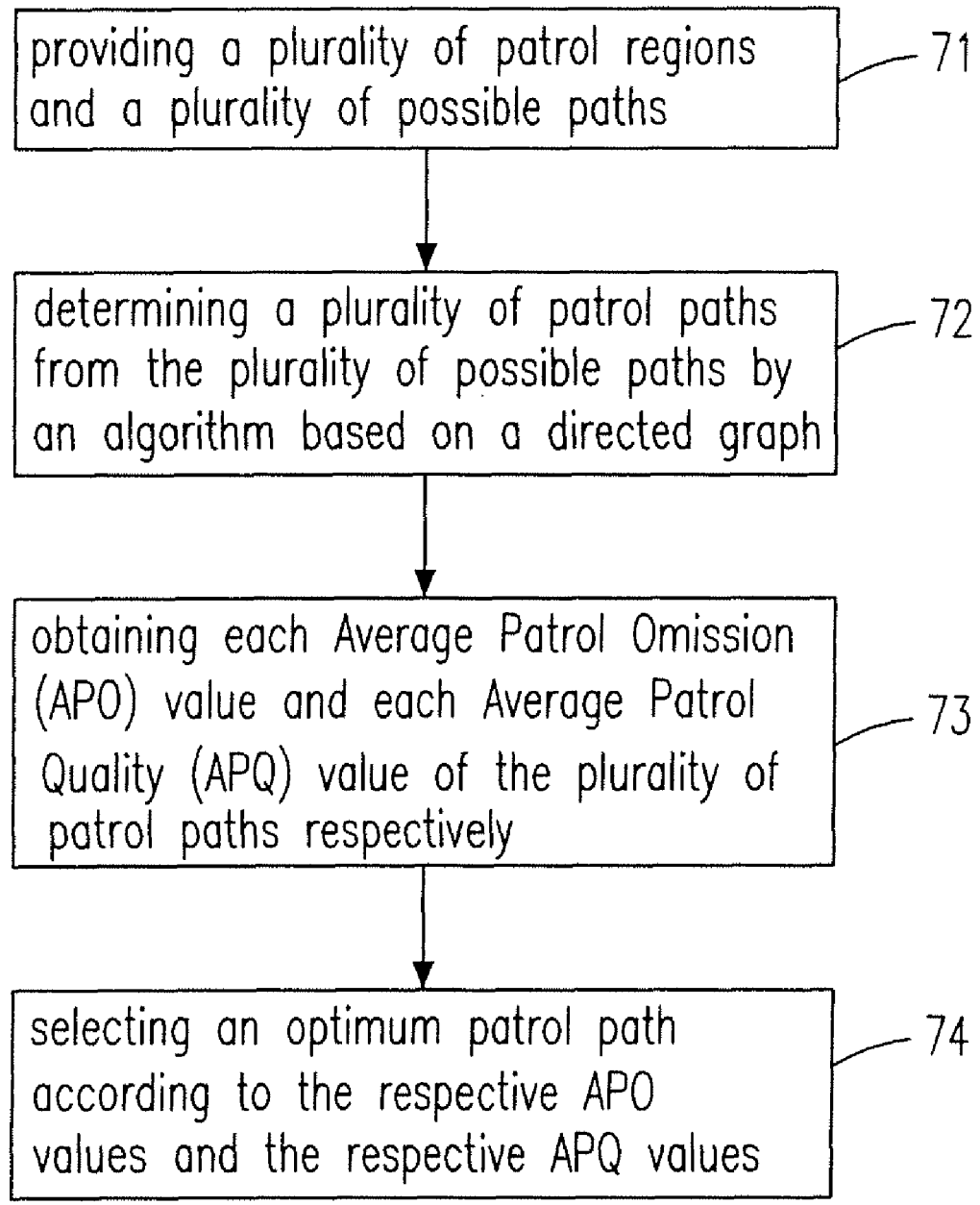
FIG. 7 is a diagram showing a first preferred patrol path planning method of the invention.

Please refer to FIG. 7, which shows a flow chart of a first preferred patrol path planning method of the invention. The first preferred method includes a step 701 of providing a plurality of patrol regions and a plurality of possible paths, a step 702 of determining a plurality of patrol paths from the plurality of possible paths by an algorithm based on a directed graph, a step 703 of obtaining each Average Patrol Omission (APO) value and each Average Patrol Quality (APQ) value of the plurality of patrol paths respectively, and a step 704 of selecting an optimum patrol path according to the respective APO values and the respective APQ values. Furthermore, the plurality of patrol regions could be selected by a patrolman or a task commander. The directed graph has the plurality of patrol regions and a plurality of passages and the algorithm is one of a Shortest Path Permutation Method (SPPM) and a Locally Optimum Repetitious Method (LORM). The SPPM could be performed by a Dijkstra algorithm. The LORM could be performed by a Patrol Depth First Search (P-DFS) algorithm and the P-DFS algorithm uses at least one of a Patrol Time (PT) and a Repeat Limit (RL) as an operating limitation. Each of the plurality of patrol paths passes through a plurality of passed patrol regions each of which has a Patrol Omission value and a Patrol Quality value. The APO value and the APQ value are respectively an average of the respective Patrol Omission values and an average of the respective Patrol Quality values of the plurality of passed patrol regions of the corresponding patrol path. It is noted that all the APO values and all the APQ values of the plurality of patrol paths could be calculated to select the optimum patrol path. There could be another method based on the invention and it includes steps of providing a plurality of patrol paths and a plurality of selected patrol regions each of which has a Patrol Omission (PO) value and a Patrol Quality (PQ) value; and selecting an optimum patrol path from the plurality of patrol paths according to one set of values selected from a group consisting of the respective PO values, the respective PQ values and a combination thereof. A model having a plurality of patrol regions and a plurality of possible patrol paths could also be established for providing the plurality of patrol paths and the plurality of selected patrol regions. Each of the possible patrol paths could connect at least two of the plurality of patrol regions.

An operation of the above-mentioned methods for patrol path planning could be executed through at least one operating unit, such as a desktop computer, a notebook computer, an industrial computer, an electrical device having an operating processor and so on. Moreover, a robot with the operating unit could move according to an optimum patrol path provided by the above-mentioned methods for patrol path planning.

A patrol device is described as follows.

Figure 8:
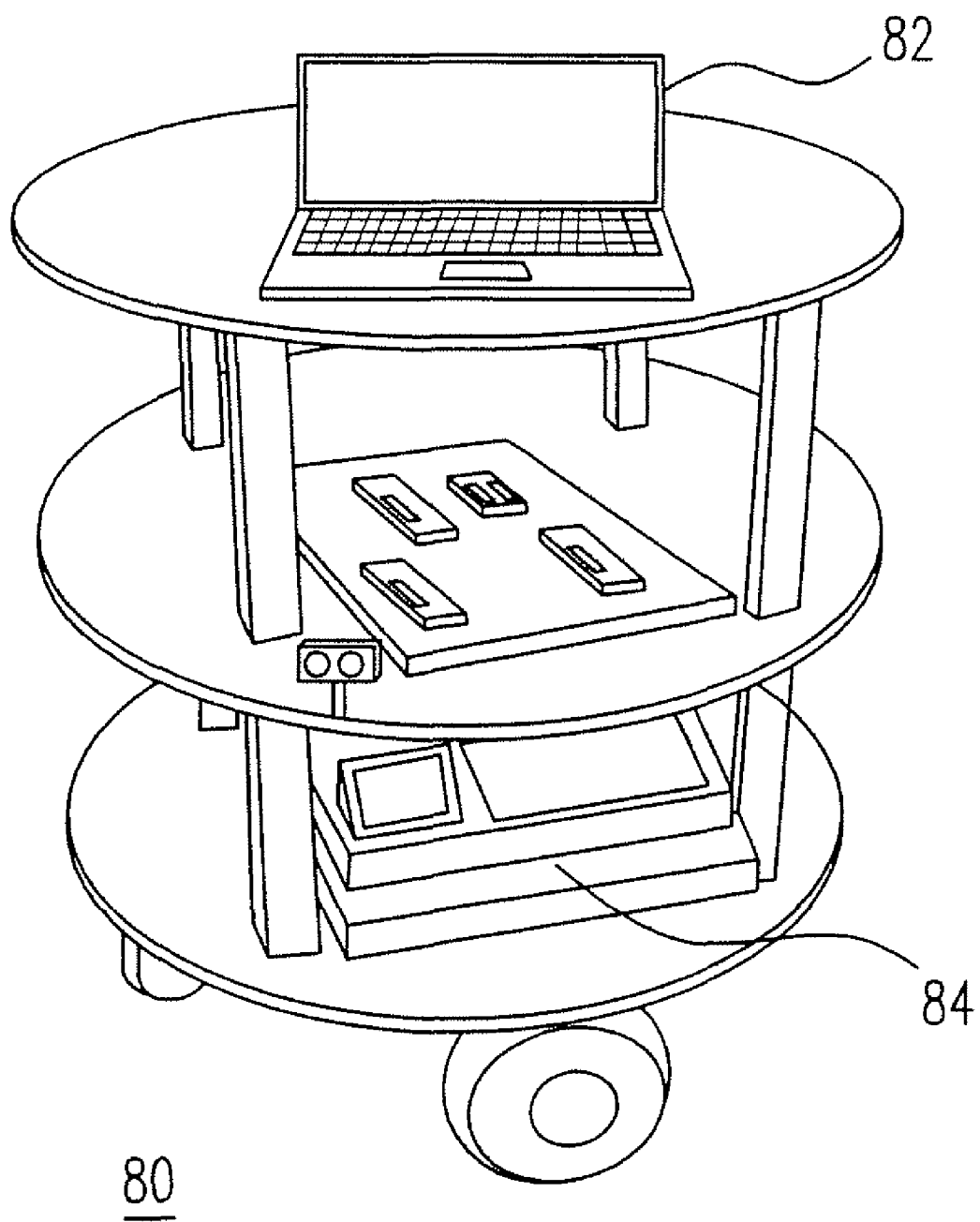
FIG. 8 is a diagram showing a first preferred embodiment of patrol devices of the invention.

Based on the above patrol path planning methods, a patrol device performing patrol task according to the above patrol path planning methods is provided. Please refer to FIG. 8, which shows a first preferred embodiment of patrol devices of the invention. In a simple framework, the patrol device 80 in FIG. 8 at least includes an operating unit 82 and a moving unit 84, and the moving unit 84 could be a vehicle or other device capable of moving. The operating unit 82 could be a desktop computer, a notebook computer, an industrial computer, an electrical device having an operating processor and so on. The moving unit 84 is configured to drive the patrol device 80. The operating unit 82 disclosed in FIG. 8 can execute the above patrol path planning methods. After calculating an optimum patrol path, the operating unit 82 transports the optimum patrol path as a patrol instruction to the moving unit 84. Then, the moving unit 84 receives the patrol instruction and move according to the optimum patrol path. The patrol device 80 performs a patrol or/and security task under the optimum patrol path provided by the above methods thereby. This kind of patrol device could be achieved preferably through a robot configuration, and such robot is appropriate for security in particular.

What is claimed is:

1. A patrol path planning method, comprising the steps of:
   setting an Allowed Vacant Time (AVT);
   providing a plurality of patrol paths, each of which passes through a plurality of patrol regions, each of which has a Patrol Omission (PO) value determined by whether the respective passed patrol region is patrolled or not within the AVT and a Patrol Quality (PQ) value determined by a ratio of an average time per patrol for the respective passed patrol region to the AVT;
   obtaining an Average Patrol Omission (APO) value and an Average Patrol Quality (APQ) value for each of the plurality of patrol paths; and
   evaluating the plurality of patrol paths according to the respective APO values and the respective APQ values so as to select an optimum patrol path therefrom.

2. A planning method as claimed in claim 1 further comprising the steps of:
   providing the plurality of patrol regions; and
   providing a plurality of possible paths each of which connects all of the plurality of patrol regions.

3. A planning method as claimed in claim 2 further comprising the steps of:
   determining the plurality of patrol paths according to the plurality of possible paths by an algorithm based on a directed graph; and
   calculating all the APO values and all the APQ values of the plurality of patrol paths to select the optimum patrol path.

4. A planning method as claimed in claim 3, wherein the directed graph having the plurality of patrol regions and a plurality of passages for an operation of the algorithm.

5. A planning method as claimed in claim 3, wherein the plurality of possible paths have a plurality of path combinations to be the plurality of patrol paths.

6. A planning method as claimed in claim 3, wherein the algorithm is one of a Shortest Path Permutation Method (SPPM) and a Locally Optimum Repetitious Method (LORM).

7. A planning method as claimed in claim 6, wherein the SPPM is performed by a Dijkstra algorithm.

8. A planning method as claimed in claim 6, wherein the LORM is performed by a Patrol Depth First Search (P-DFS) algorithm.

9. A planning method as claimed in claim 8, wherein the P-DFS algorithm uses at least one of a Patrol Time (PT) and a Repeat Limit (RL) as an operating limitation.

10. A planning method as claimed in claim 1, wherein the APO value and the APQ value are respectively an average of the respective Patrol Omission values and an average of the respective Patrol Quality values of the plurality of passed patrol regions of the corresponding patrol path.

11. A planning method as claimed in claim 1, wherein the optimum patrol path is provided to a robot for moving accordingly.

12. A route planning method, comprising the steps of:
providing a plurality of patrol paths and a plurality of selected patrol regions each of which has a Patrol Omission (PO) value and a Patrol Quality (PQ) value, wherein the PO value is determined based on whether the respective selected patrol region is patrolled or not within an Allowed Vacant Time (AVT) and the PQ value is determined based on a ratio of an average time per patrol for the respective selected patrol region to the AVT; and
selecting an optimum patrol path from the plurality of patrol paths according to one set of values selected from a group consisting of the respective PO values, the respective PQ values and a combination thereof.

13. A planning method as claimed in claim 12, wherein the plurality of patrol paths are provided by a Patrol Depth First Search (P-DFS) method.

14. A planning method as claimed in claim 13 further comprising using at least one of a Patrol Time (PT) and a Repeat Limit (RL) as an operating limitation of the P-DFS method.

15. A planning method as claimed in claim 12 further comprising a step of establishing a patrol model having a plurality of patrol regions and a plurality of possible patrol paths each of which connects at least two of the plurality of patrol regions.

16. A planning method as claimed in claim 15 further comprising the steps of:
providing the plurality of patrol paths according to the plurality of possible patrol paths by an algorithm; and
calculating the respective PO values and the respective PQ values to select the optimum patrol path.

17. A patrol device, comprising:
an operating unit configured to establish a plurality of patrol paths, each of which has an Average Patrol Omission (APO) value and an Average Patrol Quality (APQ) value, and to determine an optimum patrol path from the plurality of patrol paths according to the APO value and the APQ value, wherein each of the plurality of patrol paths passes through a plurality of regions, each of which has a Patrol Omission (PO) value determined based on whether the respective region is patrolled or not within an Allowed Vacant Time (AVT) and a Patrol Quality (PQ) value determined based on a ratio of an average time per patrol for the respective region to the AVT; and
a moving unit configured to move along the optimum patrol path.

18. A patrol device as claimed in claim 17, wherein the operating unit is one selected from a group consisting of a desktop computer, a notebook computer, an industrial computer and an electrical device having an operating processor, the APO value and the APQ are calculated by the operating unit, and the moving unit is a vehicle.

19. A patrol device as claimed in claim 17 further configured in a robot.

20. A patrol device as claimed in claim 17, wherein the operating unit establishes a patrol model having the plurality of patrol paths, and the moving unit receives a moving command from the operating unit so as to move along the optimum patrol path.

* * * * *